United States Patent
Song et al.

(10) Patent No.: US 8,896,919 B2
(45) Date of Patent: Nov. 25, 2014

(54) AUTOSTEREOSCOPIC DISPLAY SYSTEM AND METHOD

(75) Inventors: Lei Song, Shenzhen (CN); Jing Zhang, Shenzhen (CN)

(73) Assignee: Superd Co., Ltd., Shenzhen (CN)

( * ) Notice: Subject to any disclaimer, the term of this patent is extended or adjusted under 35 U.S.C. 154(b) by 590 days.

(21) Appl. No.: 12/939,166

(22) Filed: Nov. 3, 2010

(65) Prior Publication Data

US 2012/0092762 A1    Apr. 19, 2012

(30) Foreign Application Priority Data

Oct. 15, 2010    (CN) .......................... 2010 1 0510410

(51) Int. Cl.
| | |
|---|---|
| *G02B 27/22* | (2006.01) |
| *G02B 27/26* | (2006.01) |
| *H04N 13/04* | (2006.01) |
| *H04N 13/00* | (2006.01) |
| *G02F 1/29* | (2006.01) |

(52) U.S. Cl.
CPC ........ *G02B 27/2214* (2013.01); *H04N 13/0404* (2013.01); *G02B 27/26* (2013.01); *H04N 2013/0081* (2013.01); *H04N 13/0413* (2013.01); *G02F 2001/294* (2013.01)
USPC .............. 359/463; 359/464; 359/462; 348/59

(58) Field of Classification Search
CPC ............... G02B 27/2214; G02B 27/26; H04N 13/0409; G02F 1/29
USPC ........... 359/463, 464; 348/51; 349/15, 200, 5; 345/32
See application file for complete search history.

(56) References Cited

U.S. PATENT DOCUMENTS

| | | | |
|---|---|---|---|
| 4,385,805 A | 5/1983 | Channin | |
| 5,315,377 A * | 5/1994 | Isono et al. | ...................... 348/51 |
| 5,493,427 A * | 2/1996 | Nomura et al. | .................... 349/5 |
| 6,665,108 B2 | 12/2003 | Brown et al. | |
| 6,999,071 B2 | 2/2006 | Balogh | |
| 7,357,510 B2 | 4/2008 | Kim et al. | |
| 7,375,784 B2 | 5/2008 | Smith et al. | |
| 7,486,341 B2 | 2/2009 | Hong et al. | |
| 7,623,188 B2 | 11/2009 | Hamagishi | |
| 7,697,109 B2 | 4/2010 | Yun et al. | |
| 7,701,637 B2 | 4/2010 | Redert | |
| 7,714,946 B2 | 5/2010 | Hong et al. | |
| 7,940,369 B2 * | 5/2011 | Yun et al. | ...................... 349/200 |
| 2002/0181126 A1 | 12/2002 | Nishioka | |
| 2004/0021802 A1 | 2/2004 | Yoshino et al. | |
| 2004/0179280 A1 | 9/2004 | Nishioka | |
| 2004/0240777 A1 | 12/2004 | Woodgate et al. | |
| 2005/0248705 A1 | 11/2005 | Smith et al. | |
| 2006/0050016 A1 * | 3/2006 | Tomisawa et al. | .............. 345/32 |
| 2006/0139751 A1 | 6/2006 | Cha et al. | |
| 2006/0273919 A1 | 12/2006 | Sato et al. | |
| 2007/0195410 A1 | 8/2007 | Yun et al. | |
| 2007/0296911 A1 | 12/2007 | Hong | |

(Continued)

*Primary Examiner* — Audrey Y Chang
(74) *Attorney, Agent, or Firm* — Anova Law Group, PLLC (57) ABSTRACT

A three-dimensional (3D) display system is provided. The 3D display system includes a display device and an optical device. The display device is configured to display sets of images with parallax for a 3D display. The optical device has electric-signal-controllable optical parameters and is coupled with the display device. Further, the optical device is configured to enable directional light transmission so as to separate lights of the sets of images into predetermined viewing directions to effect the 3D display.

10 Claims, 6 Drawing Sheets

(56) References Cited

U.S. PATENT DOCUMENTS

| | | |
|---|---|---|
| 2008/0129899 A1 | 6/2008 | Sharp |
| 2008/0129900 A1 | 6/2008 | Sharp |
| 2008/0204663 A1 | 8/2008 | Balogh |
| 2008/0252556 A1 | 10/2008 | Tseng et al. |
| 2008/0252720 A1 | 10/2008 | Kim et al. |
| 2008/0278639 A1 | 11/2008 | Hamagishi |
| 2008/0278808 A1 | 11/2008 | Redert |
| 2009/0015737 A1 | 1/2009 | Jung et al. |
| 2009/0015738 A1 | 1/2009 | Hong et al. |
| 2009/0015739 A1 | 1/2009 | Shin et al. |
| 2009/0015918 A1 | 1/2009 | Morozumi et al. |
| 2009/0033812 A1 | 2/2009 | Ijzerman et al. |
| 2009/0109154 A1 | 4/2009 | Hong et al. |
| 2009/0122210 A1 | 5/2009 | Im |
| 2009/0147160 A1 | 6/2009 | Roosendaal et al. |
| 2009/0153653 A1 | 6/2009 | Lee et al. |
| 2009/0153754 A1 | 6/2009 | Jung |
| 2009/0190048 A1 | 7/2009 | Hong et al. |
| 2009/0190049 A1* | 7/2009 | Hong et al. .............. 349/15 |
| 2010/0149444 A1 | 6/2010 | Hikmet et al. |

\* cited by examiner

AUTOSTEREOSCOPIC DISPLAY SYSTEM AND METHOD

CROSS-REFERENCES TO RELATED APPLICATIONS

This application claims the priority of Chinese patent application no. 2010105104102, filed on Oct. 15, 2010, the entire contents of which are incorporated herein by reference.

FIELD OF THE INVENTION

The present invention generally relates to opt-electronic and autostereoscopic display technologies and, more particularly, to the methods and systems for parameter-adjustable autostereoscopic display.

BACKGROUND

Autostereoscopic display technology provides three dimensional (3D) imagery without the need for special glasses or other viewing aids, and thus may provide for greater commercial acceptance. Conventional autostereoscopic display technology often uses a static parallax barrier or lenticular screen to effect 3D display. The static parallax barrier or lenticular screen is manufactured with certain system parameters. As a result of the manufacture of the barrier or screen, the system parameters such as grating width of the barrier or screen are fixed once constructed and cannot be changed without building a new barrier or screen.

Further, the conventional autostereoscopic display technology uses parallax between two sets of images to show 3D images via the parallax barrier or lenticular screen, which may often have a small fixed grating width. The fixed grating width thus only supports a limited range of parallax. If an actual parallax exceeds this limited range, it may result in the displayed images having a bad quality, such as causing interference, ghosting and other undesired behavior. On the other hand, if a large grating width is used, although it may allow a large range of parallax, the clarity of the 3D images may be reduced.

Certain virtual reality system display techniques have been developed to dynamically change parallax barrier strip width. For example, U.S. patent application publication no. 20080143895, titled "dynamic parallax barrier autostereoscopic display system and method," disclosed a virtual reality display system that uses a specific 2-LCD stack system dynamically generating parallax strips based on head movement tracking. However, such techniques may be limited to the disclosed specific 2-LCD stack system and may often fail to address impacts of the dynamically generated parallax strips.

The disclosed methods and systems are directed to solve one or more problems set forth above and other problems.

BRIEF SUMMARY OF THE DISCLOSURE

One aspect of the present disclosure includes a three-dimensional (3D) display system. The 3D display system includes a display device and an optical device. The display device is configured to display sets of images with parallax for a 3D display. The optical device has electric-signal-controllable optical parameters and is coupled with the display device. Further, the optical device is configured to enable directional light transmission so as to separate lights of the sets of images into predetermined viewing directions to effect the 3D display.

Another aspect of the present disclosure includes a method used in a 3D display system. The 3D display system includes a display device configured to display at least two sets of images with parallax for 3D display and an optical device coupled with the display device. The optical device is configured to enable directional light transmission so as to separate the sets of images into predetermined viewing directions effect the 3D display. The method includes receiving relevant operational information of the 3D display system, and determining whether to adjust at least one system parameter of the optical device based on the received operational information. The method also includes calculating at least one of parallax information between the sets of images and 3D display region information when it is determined to adjust the system parameter. Further, the method includes determining at least a new value for the system parameter of the optical device based on the at least one of parallax information between the sets of images and 3D display region information, and applying the new value to the optical device.

Another aspect of the present disclosure includes an optical device. The optical device includes a first substrate having a plurality of first-type electrodes; and a second substrate having at least one second-type electrode. The optical device also includes an optical material contained between the first substrate and the second substrate. The optical material is configured to form a lens grating capable of directional light transmission to separate lights of sets of images with parallax into predetermined viewing directions to effect a 3D display. Further, the lens grating has electric-signal-controllable optical parameters when a plurality of voltages are applied to the first-type electrodes and second-type electrode.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1A:
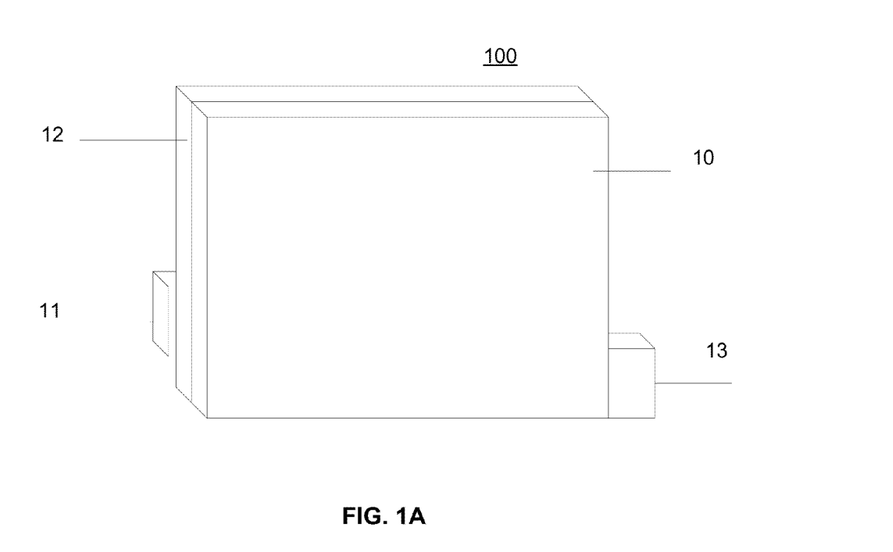
FIG. 1A illustrates a block diagram of an exemplary autostereoscopic display system consistent with the disclosed embodiments.

FIG. 1A shows an exemplary block diagram of an autostereoscopic display system 100 consistent with the disclosed embodiments. As shown in FIG. 1A, autostereoscopic display system 100 may include an optical device 10, a controller 11, a display device 12, and a signal source 13. Other components may be added and certain devices may be removed without departing from the principles of the disclosed embodiments.

Display device 12 may include any appropriate device for displaying images, such as a plasma display panel (PDP) display, a cathode ray tube (CRT) display, a liquid crystal display (LCD), an organic light emitting diode (OLED) display, and other types of displays. Display device 21 may be used in computers, consumer electronics, professional equipment, or other systems requiring information display. Display device 12 may be coupled with signal source 13 to display two-dimensional (2D) images and 3D images. Signal source 13 may include any appropriate source of audio, video, and images, such as output from a set top box, a digital receiver, a TV tuner, a network adaptor, an information storage, or a DVD or other media player.

For 3D images, signal source 13 may be provided with sets of images with certain parallax to be viewed by a viewer's left eye and right eye separately, and display device 12 may display the sets of images concurrently. The 3D images may include at least two sets of images used for 3D display. The 3D images may be in a stereo format, which means that a 3D image includes two images from two viewpoints, a first image and a second image. For example, the 3D image includes a first image to be viewed by a viewer's left eye (i.e., a left image) and a second image to be viewed by the viewer's right eye (i.e., a right image), with a certain parallax between the left image and the right image.

The 3D images may also be in a multi-view format, which means a 3D image includes multiple images from multiple viewpoints. For example, the 3D image may include the first, second, . . . and $N^{th}$ images (N is an integer number greater than 2). A certain parallax exists between two neighboring images of the N images to be viewed by a viewer's left and right eyes respectively.

Further, display device 12 may be coupled with optical device 10 such that lights from display device 12 are transmitted along predetermined viewing directions to separate the sets of images in order to display 3D images associated with the sets of images to the viewer. That is, the viewer's left eye and right eye can only see a related set of images to achieve a 3D perception.

Optical device 10 may include any appropriate optical device capable of generating 3D effects by separating sets of images on display device 12 into different directions for a viewer(s) to perceive 3D images. For example, optical device 10 may include a parallax barrier (e.g., a slit grating) and/or lenticular screen (e.g., a lens grating) to separate interleaved left and right images for a single viewer or multiple viewers. Other types of structures may also be included.

Optical device 10 may also have dynamically adjustable system parameters to improve the quality of 3D images and/or user viewing experience. Such adjustable system parameters may include adjustable width, length, and/or orientation of gratings of optical device 10, and/or adjustable brightness, transparency, and other characteristics of optical device 10. For example, optical device 10 may be dynamically configured to be transparent without light refraction such that optical device 10 does not change entering lights and display system 100 displays 2D images, or optical device 10 may be configured to a grating device (e.g., a lenticular lens grating or a parallax barrier grating) to enable directional light transmission to enable 3D image display as explained in sections below. This 2D/3D switching may be controlled by controller 11 during operation.

Figure 3:
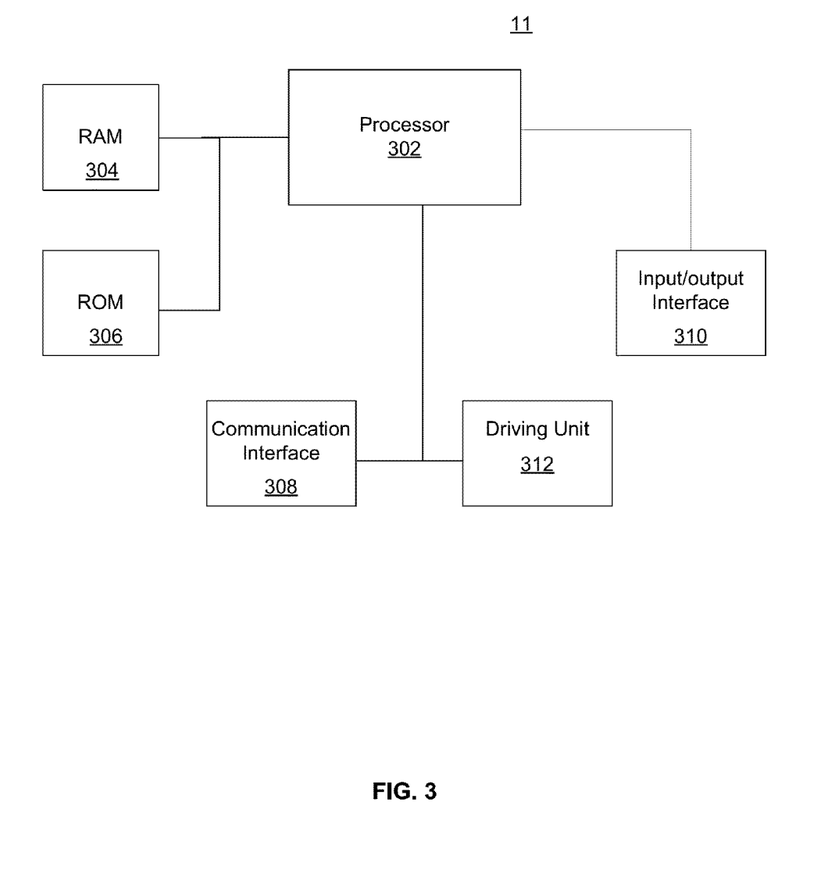
FIG. 3 illustrates a block diagram of an exemplary controller consistent with the disclosed embodiments.

Controller 11 may be provided to control optical device 10 (e.g., to control certain adjustable system parameters). In other words, optical device 10 has electric-signal-controllable system paramters or optical parameters. Controller 11 may also control operation of autostereoscopic display system 100 including display device 12. Further, controller 11 may include any appropriate control device capable of providing control functions for autostereoscopic display system 100. FIG. 3 shows an exemplary block diagram of controller 11.

As shown in FIG. 3, controller 11 may include a processor 302, a random access memory (RAM) unit 304, a read-only memory (ROM) unit 306, a communication interface 308, an input/output interface unit 310, and a driving unit 312. Other components may be added and certain devices may be removed without departing from the principles of the disclosed embodiments.

Processor 302 may include any appropriate type of general purpose microprocessor, digital signal processor or microcontroller, and application specific integrated circuit (ASIC). Processor 302 may execute sequences of computer program instructions to perform various processes associated with autostereoscopic display system 100. The computer program instructions may be loaded into RAM 304 for execution by processor 302 from read-only memory 306.

Communication interface 308 may provide communication connections such that autostereoscopic display system 100 may be accessed remotely and/or communicate with other systems through computer networks or other communication networks via various communication protocols, such as transmission control protocol/internet protocol (TCP/IP), hyper text transfer protocol (HTTP), etc.

Input/output interface 310 may be provided for users to input information into autostereoscopic display system 100 or for the users to receive information from autostereoscopic system 100. For example, input/output interface 310 may include any appropriate input device, such as a remote control, a keyboard, a mouse, an electronic tablet, voice communication devices, or any other optical or wireless input devices. Further, driving unit 312 may include any appropriate driving circuitry to drive various devices, such as optical device 10 and/or display device 12. For example, driving circuitry of driving unit 312 may provide different voltages to various electrodes of optical device 10.

Figure 1B:
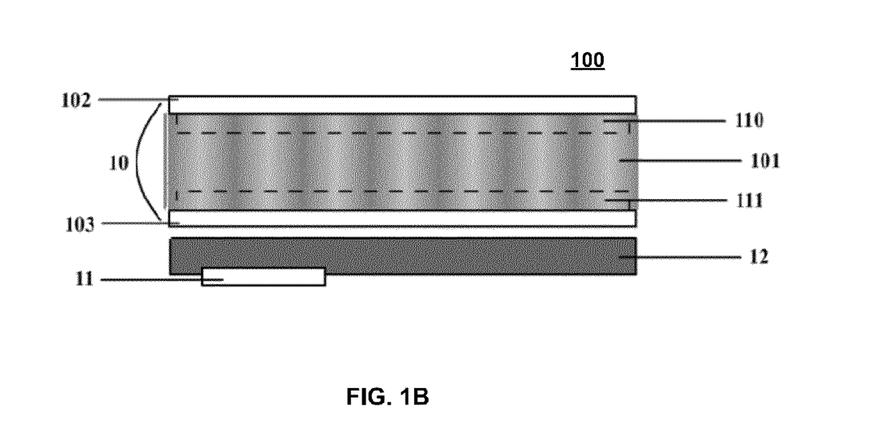
FIG. 1B illustrates a cross-section view of an exemplary autostereoscopic display system consistent with the disclosed embodiments.

FIG. 1B illustrates an exemplary cross-section view of autostereoscopic display system 100. As shown in FIG. 1B, optical device 10 may be placed on top of or coupled with display device 12, and may include a first substrate 102, a second substrate 103, and optical material 101. Substrates 102 and 103 may be made of any appropriate material, such as glass or silicon. Optical material 101 may include any appropriate type of optical material whose refractive index may change under different voltages applied thereto or light passage through which may be switched between an on-state and an off-state when the applied voltage changes. For example, optical material 101 may include nematic liquid crystal, ferroelectric liquid crystal, other types of liquid crystal, or any appropriate electrowetting materials and polymers.

Optical material 101 may be placed between substrates 102 and 103. Electrode sections 110 and 111 are attached to or built on the surfaces of substrates 102 and 103, respectively, such as using thin-film based techniques. Electrical voltages applied to electrode sections 110 and 111 may cause the refractive index or the light passage switching state of optical material 101 to change. Such change may create the effect of the lens or grating and thus implement the directional light transmission mechanism needed for autostereoscopic display. As disclosed herein, lens and grating may be used interchangeable. Further, different electrode voltages applied on electrode sections 110 and 111 may also change parameters of the lens or slit grating.

Electrode section 110 may include a single electrode or a plurality of electrodes, and electrode section 111 may also include a single electrode or a plurality of electrodes. Different voltages may be applied to those electrodes. The shape of the electrode or electrodes may be designed to any appropriate shape, such as a plane, strips, or other geometric shapes. Further, when a plurality of electrodes are used, the plurality of electrodes may be arranged vertically or horizontally. The vertical direction and the horizontal direction are used for exemplary purposes, any appropriate directions or arrangements may also be used. FIGS. 2A, 2B, 2C, 2D, and 2E illustrate certain exemplary structures of optical device 10.

Figure 2A:
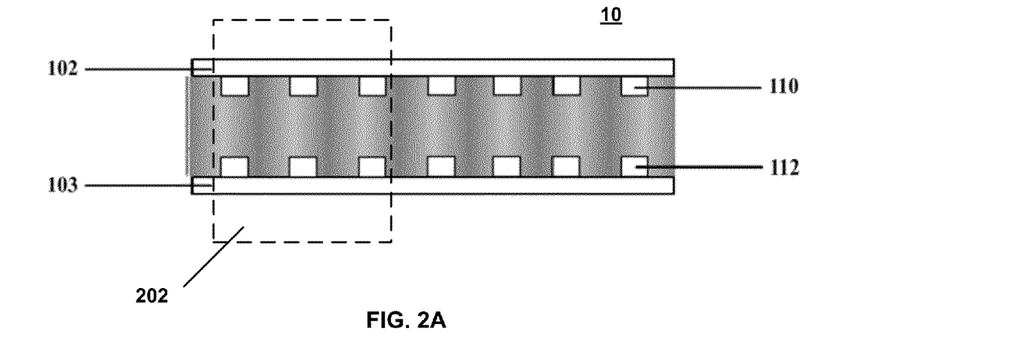
FIG. 2A illustrates an exemplary structure of an optical device consistent with the disclosed embodiments.

As shown in FIG. 2A, electrode sections 110 and 112 each includes a plurality of electrodes in a strip shape and arranged horizontally. A certain number of electrodes from section 110 and a certain number of electrodes from section 112 may be combined to comprise an effective unit 202. For illustrative purpose, the number of electrodes from section 110 and the corresponding number of electrodes from section 112 are the same and denoted as 'n'.

When different voltages are applied to the n number of electrodes in sections 110 and 112, an electric field is formed between the electrodes of sections 110 and 112. The electric field causes certain changes in optical material 101. For example, along the electric field, molecules of optical material 101 (e.g., liquid crystal) may arrange in a certain angle, and different parts or locations of optical material 101 (within effective unit 202) may have different refractive indices and optical paths.

Thus, by controlling voltages applied to the n number of electrodes in sections 110 and 112, effective unit 202 may have a lens effect. That is, effective unit 202 may become a lens unit (e.g., a lenticular lens). Different voltages may be applied to one of sections 110 and 112 while applying a same voltage to the other section, or different voltages may be applied to both of sections 110 and 112.

Autostereoscopic display system 100 is also configured such that images from display device 12 are located at the focal plane of the lens unit. Thus, during operation, optical device 10 may be configured to have an array of effective units (e.g., a lenticular screen) used for autostereoscopic display. Further, system parameters of optical device 10 may be dynamically adjusted.

For example, if there is a need to adjust the lens grating width, instead of having n number of electrodes, effective unit 202 may be configured to have m number of electrodes from section 110 and/or section 112. When m<n, the lens grating width of effective unit 202 decreases, and when m>n, the lens grating width of effective unit 202 increases. However, because the thickness of effective unit 202 does not change, changes in the lens grating width may change the focal length of effective unit 202.

Such change in the focal length may cause images from display device 12 off the focal plane of optical device 10. To improve the quality of 3D images displayed by optical device 10, changes in the number of electrodes (i.e., m relative to n) may be kept in a certain range such that the change in the focal length is minimized. Further, image processing techniques may be used to optimize or adjust the parallax between sets of images for 3D display. For example, the range of parallax between the sets images may be slightly reduced according to a certain overall percentage, thus making the slight change in focal length go un-noticed by the viewer. Other methods may also be used.

Figure 2B:
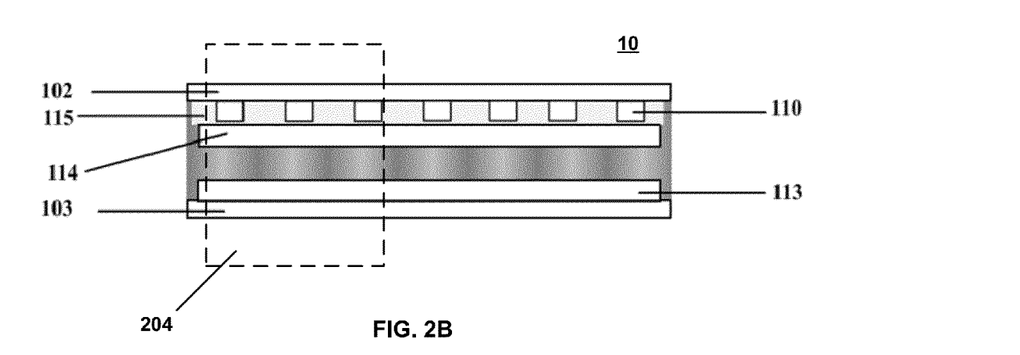
FIG. 2B illustrates another exemplary structure of an optical device consistent with the disclosed embodiments.

FIG. 2B illustrates another exemplary structure of optical device 10. As shown in FIG. 2B, in addition to substrates 102 and 103 and electrode section 110, optical device 10 may also include an electrode section 113, an electrode section 114, and an insulation layer 115. Insulation layer 115 may cover electrode section 110 and may also be attached to substrate 102. Electrode section 113 may include a single electrode in a plane shape; electrode 110 may include a plurality of electrodes in the shape of strips and arranged horizontally; and electrode section 114 may include a plurality of electrodes in the shape of strips and arranged vertically. Further, electrode section 110 is coupled with electrode section 114 through insulation layer 115 such that the plurality of electrode strips of section 110 and the plurality of electrode strips of section 114 form a staggered grid. Each staggered grid cell may be independently applied with a different voltage (similar to a thin-film transistor (TFT) structure).

This grid structure may allow different regions to have different grating width, length, and other parameters. For example, an effective unit 204 of optical device 10 may include n1 horizontal electrode strips from section 110 and n2 vertical electrode strips from section 114. Then applying different voltages to the n1 electrodes (while applying a same voltage or different voltages to the n2 electrodes) will form an electric field. The electric field can control molecules of optical material 101 to arrange in accordance with a certain angle along the electric field, and make optical material 101 have different optical paths in different locations or parts. This causes effective unit 204 to have a lens effect, i.e., to form a lens unit, that can be used for 3D display.

Thus, horizontal electrode strips may cause a lens unit and may also control the lens grating width of the lens unit. Vertical electrode strips, on the other hand, may control the length of the lens unit. Thus, the length and grating width of the lens unit (i.e., effective unit 204) may be controlled dynamically. Optical device 10 may therefore be configured as one or more lens arrays with adjustable lens grating width and length.

Figure 2C:
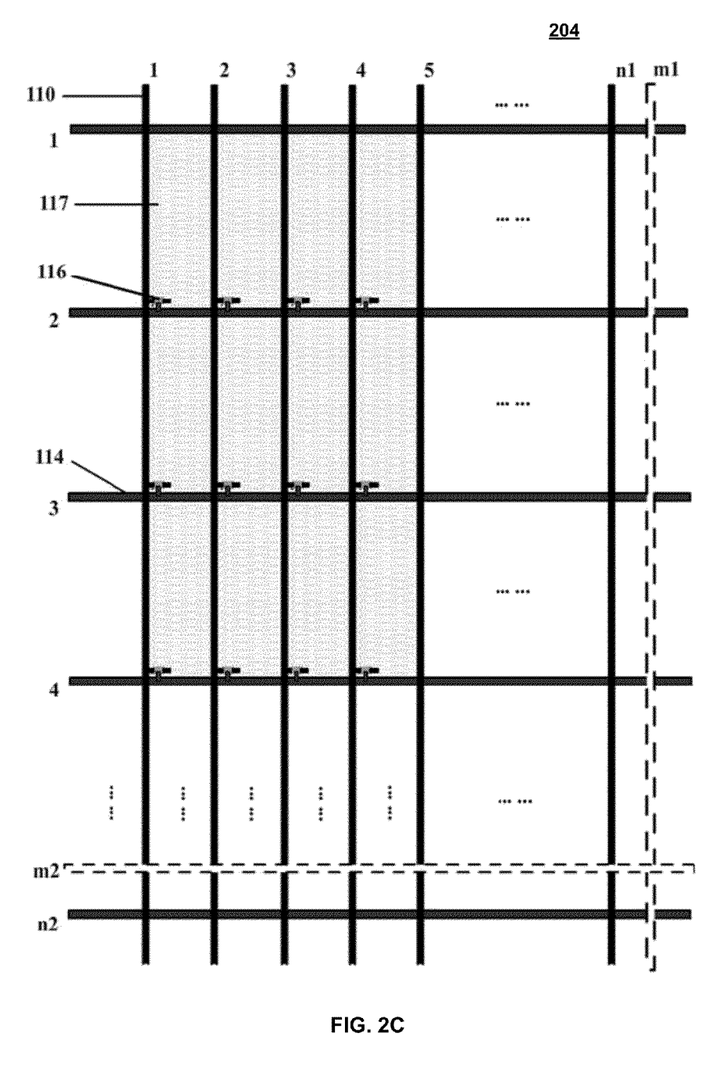
FIG. 2C illustrates an exemplary structure of an effective unit of an optical device consistent with the disclosed embodiments.

FIG. 2C illustrates an exemplary structure of electrode arrangement of an effective unit 204. As shown in FIG. 2C, effective unit 204 includes n1 (from number 1, 2, 3, 4, 5, . . . to n1) number of electrodes in section 110 and n2 (from number 1, 2, 3, 4, . . . to n2) number of electrodes in section 114. Also, n1 electrodes may be and arranged horizontally, and n2 electrodes may be arranged vertically. Further, n1 electrodes and/or n2 electrodes may also be in a strip shape or in a line shape. Other shapes may also be used. Switch circuits 116 (a TFT transistor switch or similar switch circuit, and the transistor switch is used for exemplary purposes) may be placed at cross-points of electrodes from sections 110 and 114. For example, as shown in FIG. 2C, a switch circuit 116 may be placed at every cross-point of electrode number 2 from section 114 and all electrodes from section 110. A switch circuit 116 may include any appropriate transistor switch or gate switch to be used to apply and hold certain voltages.

A thin layer of transparent conductive material 117 (e.g., indium tin oxide (ITO), or indium zinc oxide (IZO)) may be positioned on top of optical material 101 and connected to a switch circuit 116 to form a larger electrode as to have an even electric field and to improve voltage distribution and holding. The transparent conductive material layer 117 may be coupled to optical material 101 and separated into individual pieces such that the individual transparent conductive material pieces may separately cover individual grid areas. Electrode section 110, electrode section 114, insulation layer 115, switch circuit 116, and/or transparent conductive material 117 may all be individually attached to substrate 102 using thin film and other semiconductor technologies. Other configurations and technologies may also be used.

A vertically-arranged electrode from section 114 may be used as a switch control, and may be connected with a gate terminal of a switch circuit 116 (i.e., a transistor switch), and a corresponding horizontally-arranged electrode from section 110 may be used as a voltage supplier and may be connected with a source terminal of switch circuit 116. Further, a corresponding piece of transparent conductive material may be connected to a drain terminal of switch circuit 116. Other connecting configurations may also be used.

During operation, vertically-arranged electrodes from section 114 may be scanned one by one in a sequence to apply corresponding voltages. For example, a first scanned electrode (e.g., electrode 2) may open all switch circuits 116 connected to that electrode. After all switch circuits 116 (e.g., switch circuits along electrode 2 from section 114) are turned on, corresponding voltages are applied to horizontally-arranged electrodes 1 to n1 at the same time, which in turn applies the various corresponding voltages to various transparent conductive material pieces covering corresponding grid areas. The switch circuits 116 are then closed to keep or hold the various voltages. Afterwards, same steps may be applied to the next scanned electrode until all n2 vertically-arranged electrodes are scanned. These operations (e.g., scanning and applying voltages) may be controlled by controller 11 through driving unit 312.

By repeating the scanning process, effective unit 204 may function as one or more lens unit for autostereoscopic display. That is, every section of effective unit 204 (e.g., the area between vertically-arranged electrodes 1 and 2) may form a lens unit with a set of system parameters, or all sections of effective unit 204 may be configured in the same way such that effective unit 204 forms a single lens unit. When effective unit 204 acts as a single lens, the scanning process may be further simplified by applying a large voltage to all vertically arranged electrodes 1 to n2 to open all switch circuits 116 at the same time, and applying the various voltages to horizontally arranged electrodes 1 to n1. Further, as optical device 10 may include a plurality of effective units, to increase scanning speed, switch circuits 116 of effective units (i.e., lens) with the same grating width may be opened and closed at the same time.

The length and grating width of the lens unit may be controlled or adjusted dynamically. Horizontal electrode strips 1-n1 may control the lens grating width of the lens unit, and vertical electrode strips 1-n2 may control the length of the lens unit. For example, if there is a need to adjust the lens grating width and/or lens length, effective unit 204 may be configured to have m1 number of horizontal electrodes and/or m2 number of vertical electrodes. When m1<n1, the lens grating width of effective unit 204 decreases, and when m1>n1, the lens grating width of effective unit 204 increases. Similarly, when m2<n2, the lens length effective unit 204 decreases, and when m2>n2, the lens length effective unit 204 increases.

However, because the thickness of effective unit 204 does not change, changes in the lens grating width may change the focal length of effective unit 204. Such change in the focal length may cause images from display device 12 off the focal plane of optical device 10. To improve the quality of 3D images displayed by optical device 10, changes in the number of electrodes (i.e., m1 relative to n1) may be kept in a certain range such that the change in the focal length is minimized. Further, image processing techniques may be used to optimize or adjust the parallax between two sets of images for 3D display. For example, the range of parallax between the two sets images may be slightly reduced according to a certain overall percentage, thus making the slight change in focal length go un-noticed by viewer(s). Other methods may also be used.

Figure 2D:
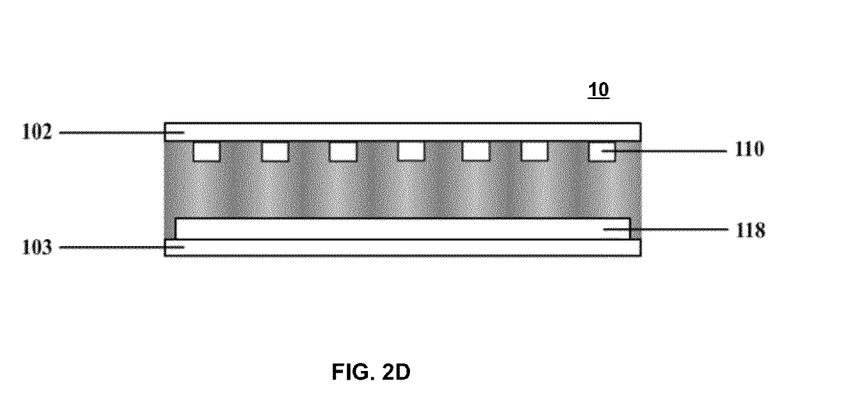
FIG. 2D illustrates another exemplary structure of an optical device consistent with the disclosed embodiments.

FIG. 2D illustrates another exemplary structure of optical device 10. As shown in FIG. 2D, electrode section 110 includes a plurality of electrode strips arranged horizontally, and electrode section 118 may include a single electrode in a plane shape. Similarly explained with respect to FIG. 2A, horizontally arranged strip electrodes may cause lens effect and may also control a grating width of a lens unit.

Figure 2E:
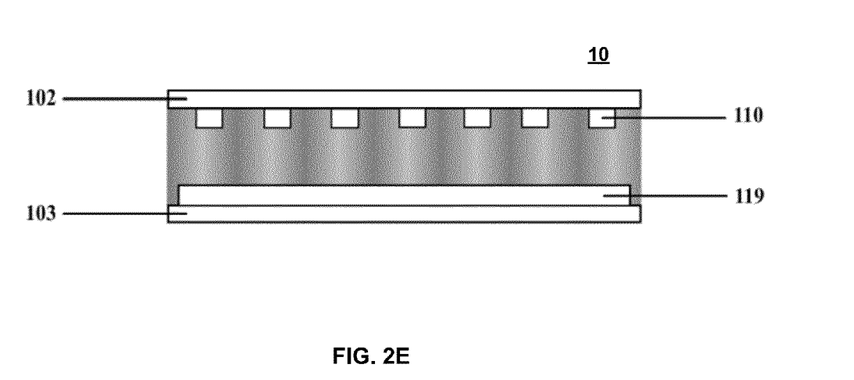
FIG. 2E illustrates another exemplary structure of an optical device consistent with the disclosed embodiments.

FIG. 2E illustrates another exemplary structure of optical device 10. As shown in FIG. 2E, electrode section 110 includes a plurality of electrode strips arranged horizontally, and electrode section 119 may include a plurality of electrode strips arranged vertically. Similarly explained with respect to FIG. 2B, horizontally arranged strip electrodes may cause lens effect and may also control a grating width of a lens unit, and vertically arranged strip electrodes may control a length of the lens unit.

Figure 4:
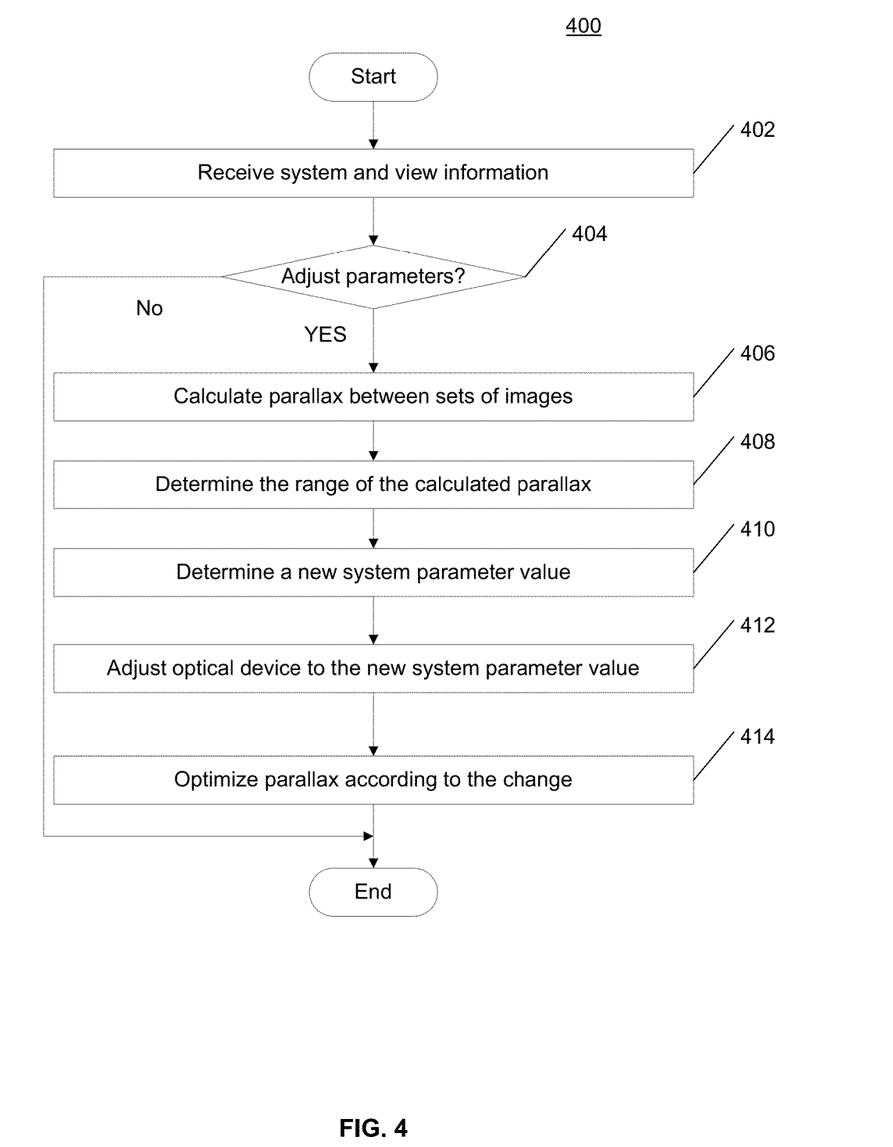
FIG. 4 illustrates an exemplary control process consistent with the disclosed embodiments.

During operation, controller 11 or, more particularly, processor 302 may perform certain processes to control and/or adjust optical device 10 to improve quality and viewing comfort of displayed 3D images. The processes may be implemented based on hardware, software, or a combination of hardware and software. FIG. 4 illustrates an exemplary process 400 performed by controller 11 (e.g., processor 302) for optical devices illustrated in FIGS. 2A-2E.

As shown in FIG. 4, processor 302 may receive certain information about operation and/or usage of autostereoscopic display system 100 (Step 402). For example, processor 302 may receive information about a viewer changing his/her viewing distance or viewing position, etc. Processor 302 may also detect or receive that parallax between sets of images for 3D display exceeds a preferred parallax range corresponding to current system configuration. Other information may also be used, such as 3D display region information. Based on received information (e.g., a new distance L, or an out-of-range parallax), processor 302 may determine whether to adjust a system parameter of optical device 10 (Step 404). For example, processor 302 may determine whether to adjust a grating width of optical device 10. Other system parameters, such as lens length of optical device 10, may also be checked to see whether adjustment is needed. Processor 302 may determine to adjust the grating width if the viewing distance L changes or if the parallax between received sets of images for 3D display exceeds the preferred parallax range.

If processor 302 determines not to adjust the system parameter (Step 404; no), processor 302 may complete the process. On the other hand, if processor 302 determines to adjust the system parameter (Step 404; yes), processor 302 may calculate parallax information based on received sets of images (Step 406). For example, processor 302 may calculate or obtain parallax values between sets of images based on parallax between each image element from the sets of images. An image element may include a single pixel or a block of pixels, and have an area of size α.

Processor 302 may determine a range of parallax based on calculated parallax values between the minimum value d1 and the maximum value d2 (Step 408). In a case of out-of-range parallax, processor 302 may also determine a new parallax range or values (d1, d2). Further, processor 302 may also determine a new system parameter (Step 410). For example, processor 302 may determine a new grating width w. Or processor 302 may determine a new lens length or a new lens parameter such as aperture, etc. Processor 302 may determine the new grating width w based on a relationship between the grating width and the parallax range (d1, d2), size α, and viewing distance L. Such relationship may be represented by a function w=F(d1, d2, α, L). This function F may be determined based on experiments or may be determined through any appropriate algorithms.

After determining the new system parameter value such as the new grating width w (Step 410), processor 302 may control other devices (e.g., driving unit 312) to dynamically adjust optical device 10 to the new system parameter value such as the new grating width (Step 412). That is, the new system parameter value is applied to optical device 10 under the control of processor 302. For example, details of adjusting the grating width or length are illustrated in previous sections (e.g., by dynamically adjusting certain number of electrodes of an effective unit or changing voltages applied to certain number of electrodes). Processor 302 may individually adjust each effective unit of optical device 10 or may uniformly adjust some or all effective units of optical device 10 depending on specific applications. Further, processor 302 may separately adjust different parts of a particular effective unit as shown in FIG. 2C and described in previous sections.

Further, optionally, processor 302 may optimize or adjust parallax of sets of images based on the new system parameter value such as the new grating width (Step 414). As explained previously, a change in grating width of an effective unit of optical device 10 may cause a slight change in the focal length of the effective unit. Processor 302 may determine the change value in the focal length. Based on the change value, processor 302 may determine an overall percentage of change to adjust parallax between sets of images, i.e., to reduce or increase the parallax between sets of images. Further, processor 302 may also apply the overall percentage of change in parallax to sets of images as displayed by display device 12.

By using the disclosed structures, parameter-adjustable optical devices may be created to be used in 3D display systems. By dynamically adjusting the parameters, such as grating width and length of the optical devices, a large range of parallax may be accommodated in avoid interference and ghosting in 3D images. Further, the disclosed parameter-adjustable autostereoscopic display system may allow viewers to view 3D display more comfortably, thereby reducing some of the symptoms caused by watching 3D display for a long time, such as dizziness and nausea.

What is claimed is:

1. A method used in a three-dimensional (3D) display system including a display device configured to display at least two sets of images with parallax for 3D display and a switchable lens coupled with the display device and configured to enable directional light transmission so as to separate the sets of images into predetermined viewing directions to effect the 3D display, the method comprising:
   receiving operational information of the 3D display system reflecting a change of operational condition of the 3D display system including at least an out-of-range parallax between the sets of images;
   determining whether to adjust at least one system parameter including a width of the switchable lens with variable width and variable refractive index controlled by activating a number of horizontally-arranged electrodes included in the switchable lens based on the received operational information;
   determining a target parallax range between the sets of images when it is determined to adjust the system parameter;
   determining at least a new value for the system parameter of the switchable lens for adjusting the width and refractive index of the switchable lens based on the target parallax range between the sets of images to correct the change of operational condition; and
   applying the new value to the switchable lens.

2. The method according to claim 1, further including:
   adjusting parallax between the sets of images after the new value is applied to the switchable lens; and
   controlling the display device to display the sets of images based on the adjusted parallax.

3. The method according to claim 2, wherein adjusting the parallax includes:
   determining a change in a focal length of the switchable lens; and
   adjusting the parallax of the sets of image by a predetermined percentage to minimize the effect of the change in the focal length.

4. The method according to claim 1, wherein:
   the operational information further includes at least a change in viewing distance of a viewer.

5. The method according to claim 4, wherein:
   the width of the switchable lens is adjusted based on the viewing distance.

6. The method according to claim 1, wherein
   the system parameter further includes a focal length of the switchable lens.

7. The method according to claim 6, wherein applying the new value includes:
   adjusting the number of activated horizontally-arranged electrodes of the switchable lens to change the width to the new value.

8. The method according to claim 6, wherein applying the new value includes
   adjusting the number of activated horizontally-arranged electrodes of the switchable lens to change the focal length to the new value.

9. The method according to claim 1, wherein the at least one system parameter also includes a length of the switchable lens controlled by activating a number of vertically-arranged electrodes, and the method further includes:
   adjusting the length t of the switchable lens by changing the number of activated vertically-arranged electrodes to correct the change of operational condition.

10. The method according to claim 9, further including:
    adjusting a size of the switchable lens by controlling the width of the switchable lens through activating a number of the horizontally-arranged electrodes and by controlling the length of the switchable lens through activating a number of the vertically-arranged electrodes.

* * * * *